Patented Dec. 30, 1924.

1,521,056

UNITED STATES PATENT OFFICE.

THEODORE FRANÇOIS TESSE, OF PARIS, FRANCE.

COMPOSITION FOR COATING.

No Drawing. Application filed January 30, 1918, Serial No. 214,521. Renewed December 11, 1920. Serial No. 430,045.

*To all whom it may concern:*

Be it known that I, THEODORE FRANÇOIS TESSE, a citizen of the Republic of Switzerland, and residing at 69 Avenue des Ternes, Paris, France, have invented certain new and useful Improvements in Composition for Coating, of which the following is a specification.

This invention relates to improved compositions, either colored or colorless, for coating purposes, and especially for coating aeroplane cloths.

Processes have already been proposed (prior to my application No. 71,201, filed January 10, 1916, referred to below) for coating aeroplane wings by means of various solutions of different cellulose esters, such as cellulose acetate, but such coatings, while they have rigidity, have no elasticity, and while they render the cloths waterproof and smooth at first, after a very short period lose their waterproof quality and their property of producing and maintaining tension, and moreover it has been found by experience that in warm climates such plain coatings become brittle in many cases.

In order to improve such products and also to obtain colored effects, it has been proposed to cover the wings impregnated with cellulose acetate with fatty varnish in linseed oil or with a coat of varnish paint. The results obtained in the campaign of 1914-15 in France have shown that such varnishes cannot meet with the requirements necessitated by the tremendous strain to which the supporting surfaces of aeroplanes are subjected.

Moreover, these products do not withstand the effects of bad weather or variations in temperature, and soon produce a slackness of the cloth. They are also extremely sensitive to mineral spirit, motor oils and prolonged action of rain. Hence the problem of a satisfactory coating was still to be solved and the present invention has for its object the provision of a coating composition meeting with all requirements and without the disadvantages previously experienced.

I have found that the solution of the problem is not in using a simple solution alone in a solvent of low boiling point, but a composition which while containing cellulose acetate of a certain character in a solvent of low boiling point, contains also a high percentage of other components found necessary in order that the finished product will meet the required conditions.

I have further found that a highly suitable coating is one composed of a succession of three layers, the composition of the intermediate one of which forms the subject matter of the present case.

I have found it to be necessary to use a cellulose acetate possessing a high degree of polymerization, such a cellulose acetate giving a solution of high viscosity. Coatings having as a base such a cellulose acetate are stable and resistant, whereas an acetate of slight degree of polymerization yields a solution of low viscosity and the coating produced therefrom is not resistant and soon becomes dry and brittle.

The addition of the other products in this invention is based on the fact, not previously considered, of the important function which can be played by the combination of certain plasticifying agents having high boiling points in the presence of an inert material.

The plasticifying agents having high boiling points particularly suitable are:

1. The bodies of the methyl-propyl-phenol series whose boiling points are about 200° C., or above, and which are mostly liquid at ordinary temperature; for instance, carvacrol (boiling point 236° C.) and also its isomer, carvol (boiling point 225° C.).

2. The esters of mono-hydric phenols having unsaturated lateral chains, as well as their isomers and their methylic derivatives, and especially eugenol (boiling point about 247.5° C.) and isoeugenol (boiling point 260° C.). One or more of the substances of classes 1 and 2 may be used, and eugenol has given especially good results.

Such class of bodies are employed in the composition in order to supply the necessary plasticity and elasticity. The substances mentioned in the last two paragraphs exercise a further important function, in that they also preserve the cellulose ester from disintegration under the action of sunlight and weather. These materials can accordingly be referred to as imparting added durability to the cellulose esters, since they prevent decomposition thereof by the elements (sunshine, rain, fog, etc.).

3. In addition to the bodies above mentioned, certain bodies are advantageously employed to give some degree of softness and suppleness for example triacetin (boiling point about 258° C.).

4. A body of a fourth class (in most cases) has to be employed in combination with bodies of the second or with the second and third classes. One of its functions is to avoid the precipitation of the cellulose ester (shown by the formation of white spots toward the end of the evaporation of the volatile solvent,) such precipitation and formation of white spots producing brittle and fragile films. Bodies of this class have a boiling point not lower than 100° C. and even those having a boiling point above 200° C. may also be employed. Examples of this class are aceto acetic ether and benzylic alcohol (boiling points 180 and 206° C. respectively).

(A) To the substances of the characteristics above mentioned an inert material is added, the function of which is to impart to the supple intermediate coating a stretching which balances any undesirable softening effect due to the relatively high percentage of substance of high boiling points necessarily used. Zinc oxid may be used as an example of this class of inert material or if it is desired to produce a colored coating, organic or mineral coloring matter may be employed. Another advantage of this inert material is the reduction of the inflammability of the finished coating.

The following is an example of the manner in which the coating composition for the intermediate layer according to (A) may be prepared:

First, an 8% solution of cellulose acetate in acetone or methyl acetate is prepared. The proportion of cellulose acetate may vary according to the density and the nature of the inert material that is employed. 100 kgs. of this solution are mixed with 2 to 5 kgs. of very fine and very light, and preferably uncompressed zinc oxid and the whole is then passed through a suitable grinding machine (e. g. a paint mill) until the zinc oxid has been converted into an impalpable powder. After the grinding operation the resulting paste has incorporated with it the following:—2 to 3 kgs. of carvol or one of the other products above mentioned, preferably eugenol, and 1 to 2 kgs. of triacetin. For the purpose of facilitating the formation of the skin produced by the application of the coating composition, acetoacetic ether is added to the composition, and if desired a small quantity of pyridine or other liquid having the properties stated, and having a boiling point not appreciably below 100° C. These additions produce a more progressive drying of the coating composition owing to the progressive elimination of the volatile substances.

(B) To the substances of the characteristics mentioned in classes 1, 2, 3 and 4 above, I also preferably add, either with or without a pigment, a metallic powder such as aluminum, such powder being composed not of granular, spherical or rounded or ground particles, but being a powder, the separate particles of which are of a flake-like or flat sheet-like character. This flake-like form of aluminum powder may conveniently be manufactured by known methods for instance from aluminum powder which may be of a somewhat coarse granular form, by passing such powder between smooth rolls, under considerable pressure, whereby the particles thereof will be flattened out, into the form desired.

When this flaky form of metallic powder is mixed with a composition as above described and the resulting composition is spread out on the surface to be coated, the flakes each settle into a substantially horizontal position, overlapping each other, whereby upon the evaporation of the low boiling point solvent, they form a laminar membrane, or a sort of a structural frame work composed of the overlapping flakes, which greatly increases the strength of the intermediate layer, and hence of the entire coating. The coating thus produced hence becomes much more firm and strong which could not be produced by the use of a powder compound of rounded granules or particles.

There is another important function produced by the use of the flake-like form of metallic powder, namely that it reflects substantially all of the light rays and in this respect is superior to other forms of material.

In many cases it is necessary to produce a colored composition, for instance for camouflage where different colors to represent forests, rocks, water, etc., are required. In such cases an inert coloring matter must be employed, but even with such inert coloring matter, the specified form of aluminum powder is highly advantageous, so that we have in fact in the coating composition two inert materials, one being the pigment and the other being the metallic powder.

While I have particularly specified the employment of aluminum, as this metal has especial utility in connection with the coating of aeroplane wings, on account of its color, etc., and on account of its malleability is easy to work into the desired flake-form, the invention is not limited thereto, but embraces also various other metals and alloys, (examples being copper, bronze, etc.).

In connection with the improvement described I have above referred to the use of pigments. These may be white or colored, examples of the two classes being zinc oxid and lead chromate. Of course various pigments of various colors may be used, but it should be borne in mind that the pigment will be one which does not deleteriously react upon the other constituents of the coating composition. Also in place of the pigments, specifically mentioned, various organic or mineral coloring matter may be used. Both the pigments and the aluminum powder serve to reduce the inflammability of the coating.

The complete coating composition for producing the intermediate layer, is given for the purpose of illustration, but the invention is not limited to the details thereof:—

First, an 8% solution of cellulose acetate in acetone or methyl acetate or other suitable volatile solvent is prepared. Into 100 kgs. of such a solution are mixed 2 to 3 kgs. of the finely powdered pigment, such as lead chromate, white zinc oxid, Turnbull's blue or burnt sienna, etc., together with 1 to 2 kgs. of the fine flake-form aluminum powder and 1 to 2 kgs. of triacetin and 2 to 3 kgs. of eugenol and 2 to 3 kgs. of benzylic alcohol. The composition is then thoroughly mixed, in any ordinary mixing machine, for a sufficient time to produce a thorough incorporation of the ingredients.

The finished coating composed of the three layers above referred to, is unaffected by variations of temperature or by the action of prolonged rain. It is impermeable, waterproof and smooth and being smooth, it presents less resistance to the air passing over the surface of the wing with a consequent increase in speed of the aeroplane.

It can be easily cleaned by washing with soap and water and can also be rapidly and readily repaired. It is unaffected by the action of light and possesses the necessary elasticity.

The present application is in part a continuation of matter disclosed in my copending applications, as follows:—

Serial No. 71,201, filed January 10, 1916, and

Serial No. 123,640, filed October 4, 1916, (claiming the processes of coating herein described).

Reference is also made to my copending application 221,089, filed Mar. 7, 1918, in which claims were presented on covering the fabrics of aeroplanes with the dope (coating composition) as claimed herein, and to the product produced.

What I claim is:

1. A coating composition comprising a solution is a volatile solvent, of a cellulose ester of a fatty acid, a liquid having a boiling point of not materially below 200° C. for imparting plasticity and elasticity, a liquid having a boiling point not appreciably below 100° C. capable of preventing the precipitation of the cellulose ester during the evaporation of the solvent, together with metallic flake-form aluminum powder.

2. A coating composition comprising a solution in a volatile solvent, of a cellulose ester of a fatty acid, a material capable of blending with said ester, having a boiling point of not materially below 200° C. and capable of imparting plasticity and elasticity, a liquid material which is capable of imparting softness, another liquid having a boiling point not appreciably below 100° C., capable of preventing the precipitation of the cellulose ester, during the evaporation of the solvent, together with an insoluble material capable of neutralizing excessive softness produced by the above mentioned additions.

3. A coating composition comprising a solution in methyl acetate of a highly polymerized cellulose acetate, eugenol, triacetine, and benzylic alcohol, together with a pigment and flaky aluminum powder.

4. A coating composition comprising a solution in a volatile solvent, of a cellulose ester of a fatty acid, a material having a boiling point of not materially below 200° C. capable of imparting plasticity and elasticity, triacetin and a liquid having a boiling point not appreciably below 100° C. capable of preventing the precipitation of the cellulose ester during the evaporation of the solvent, together with a pigment and a finely divided metallic substance.

5. A coating composition comprising a solution in a volatile solvent, of a cellulose ester of a fatty acid, a liquid having a boiling point of not materially below 200° C. for imparting plasticity and elasticity, a liquid having a boiling point not appreciably below 100° C. and capable of preventing the precipitation of the cellulose ester, and triacetin, together with an inert solid material for increasing the resistance of the coating.

6. A coating composition comprising a solution, in a volatile solvent, of a cellulose ester of a fatty acid, a liquid having a boiling point of not materially below 200° C. for imparting plasticity and elasticity, another liquid which is capable of imparting softness, a third liquid having a boiling point not appreciably below 100° C., and capable of preventing the precipitation of the cellulose ester during the evaporation of the solvent, together with an inert solid material for increasing the resistance of the coating.

7. A coating composition comprising a solution in methyl acetate of a highly polymerized cellulose acetate, eugenol, triacetin, and benzylic alcohol, together with a pigment.

8. A coating composition comprising a solution in a readily volatile solvent, of a cellulose ester of a fatty acid, a liquid having a boiling point of not materially below 200° C. for imparting plasticity and elasticity, another liquid having a boiling point not materially below 100° C. capable of preventing precipitation of the cellulose ester during the evaporation of the solvent, and an inert solid material.

9. A composition for treating aeroplane and similar fabrics comprising a relatively non-inflammable cellulose ester, a volatile solvent and added material having a boiling point approximately 245° C., whereby added durability is imparted to the cellulose ester deposit.

10. A composition for treating aeroplane and similar fabrics comprising a relatively non-inflammable cellulose ester, a volatile solvent and added material, having a boiling point approximately 245° C., whereby added durability is imparted to the cellulose deposit, and also a slowly evaporating solvent having a boiling point in the neighborhood of 160° C., whereby the slowly evaporating solvent permits gradual deposition of the cellulose ester without whitening effect.

11. A composition for treating aeroplane and similar fabrics comprising a relatively non-inflammable cellulose ester, a volatile solvent and added material having a boiling point between approximately 200 and 260° C., whereby added durability is imparted to the cellulose ester deposit, said added material being soluble in the usual solvents of cellulose esters.

12. A composition for treating aeroplane and similar fabrics comprising a relatively non-inflammable cellulose ester, a volatile solvent and added material soluble in said solvent having a boiling point between approximately 200 and 260° C., whereby added durability is imparted to the cellulose ester deposit, and also a slowly evaporating solvent capable of preventing precipitation of the cellulose ester during the evaporation of the volatile solvent, whereby the slowly evaporating solvent permits gradual deposition of the cellulose ester without whitening effect.

13. A composition for treating aeroplane and similar fabrics comprising a relatively non-inflammable cellulose ester, a tension regulating ingredient in such proportion to said cellulose ester as to reduce the tautening effect of the cellulose ester upon the fabric, and a volatile solvent for said ingredients.

14. A composition for treating aeroplane and similar fabrics comprising a relatively non-inflammable cellulose ester, a tension regulating ingredient in such proportion to the cellulose ester as to reduce the tautening effect of the cellulose ester on the fabric, said ingredient being of sufficiently high boiling point to insure the flexibility of the cellulose ester deposit, a volatile solvent for said ingredients, and a more slowly evaporating solvent capable of preventing precipitation of the cellulose ester during drying, and having a boiling point not substantially below 150° C.

15. A composition for treating aeroplane and similar fabrics comprising a relatively non-inflammable cellulose ester, a volatile solvent and added material soluble therein and capable of giving plasticity and elasticity, and having a boiling point between 225 and 260° C., whereby added durability is imparted to the coating.

16. A composition for treating aeroplane and similar fabrics comprising a relatively non-inflammable cellulose ester, a volatile solvent and added material soluble therein and capable of increasing the plasticity and elasticity of the cellulose ester, and having a boiling point between 225 and 260° C., whereby added durability is imparted to the coating.

17. A composition for treating aeroplane and similar fabrics comprising a relatively non-inflammable cellulose ester, a volatile solvent and added material capable of blending with said ester to impart plasticity and elasticity, and having a boiling point between 225 and 260° C., whereby added durability is imparted to the cellulose ester deposit, and also a slowly evaporating solvent having a boiling point not substantially below 150° C., whereby the slowly evaporating solvent permits gradual deposition of the cellulose ester without precipitation.

18. A cellulose ester dope of the kind set forth containing a cellulose ester, a smaller amount of a plasticising solvent for said cellulose ester, the boiling point of such solvent being above 200° C., together with a volatile solvent and triacetin, for the purpose specified.

19. A composition for treating aeroplane and similar fabrics comprising a relatively non-inflammable cellulose ester, a tension regulating ingredient in such proportion to said cellulose ester as to reduce the tautening effect of the cellulose ester upon the fabric, and a volatile solvent for said ingredients, and a substance adapted to prevent precipitation of the cellulose ester during the evaporation of the volatile solvent.

In testimony whereof I affix my signature.

THEODORE FRANÇOIS TESSE.